June 10, 1958   L. K. SPINK   2,838,030
FLOW CONTROLLER
Filed Sept. 28, 1954   5 Sheets-Sheet 1
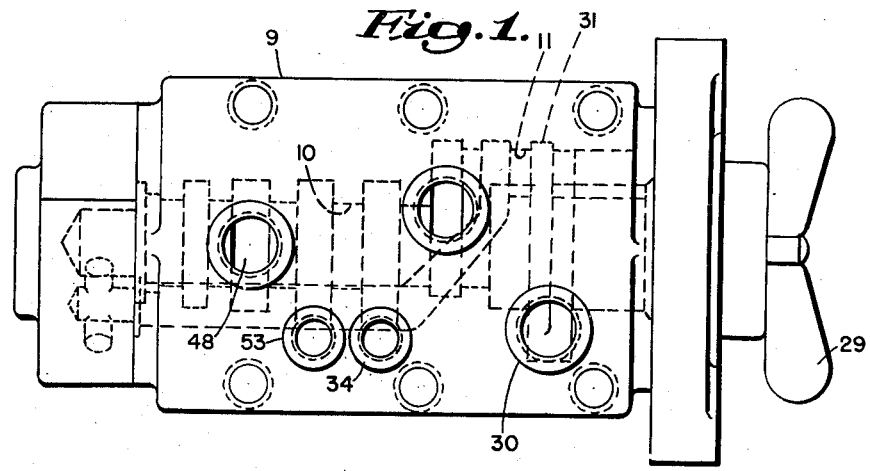
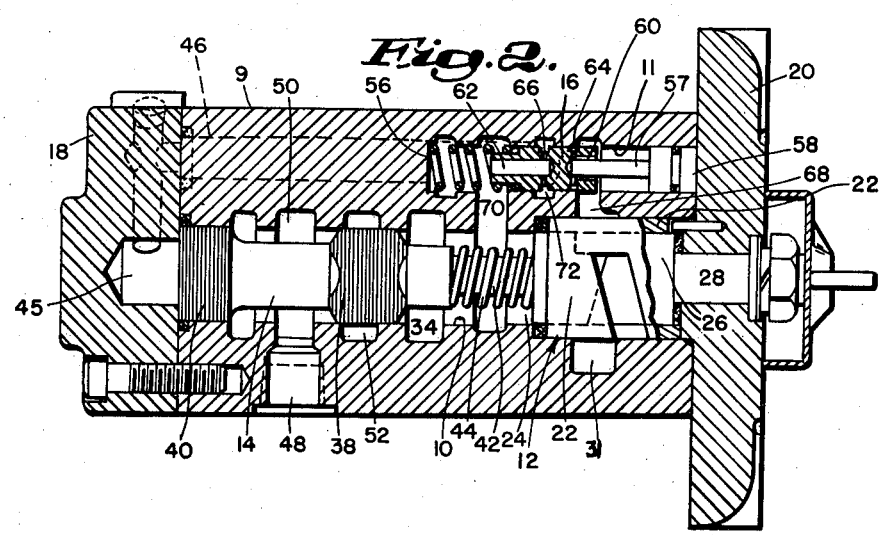
Inventor:
Leland K. Spink,
by Maxwell Fish
Attorney June 10, 1958  L. K. SPINK  2,838,030
FLOW CONTROLLER Filed Sept. 28, 1954

Inventor:
Leland K. Spink,
by Maxwell Fish
Attorney

June 10, 1958

L. K. SPINK 2,838,030

FLOW CONTROLLER

Filed Sept. 28, 1954

June 10, 1958 L. K. SPINK 2,838,030
FLOW CONTROLLER
Filed Sept. 28, 1954 5 Sheets-Sheet 4

Inventor:
Leland K. Spink,
by Maxwell Fish
Attorney

June 10, 1958 L. K. SPINK 2,838,030
FLOW CONTROLLER
Filed Sept. 28, 1954 5 Sheets-Sheet 5
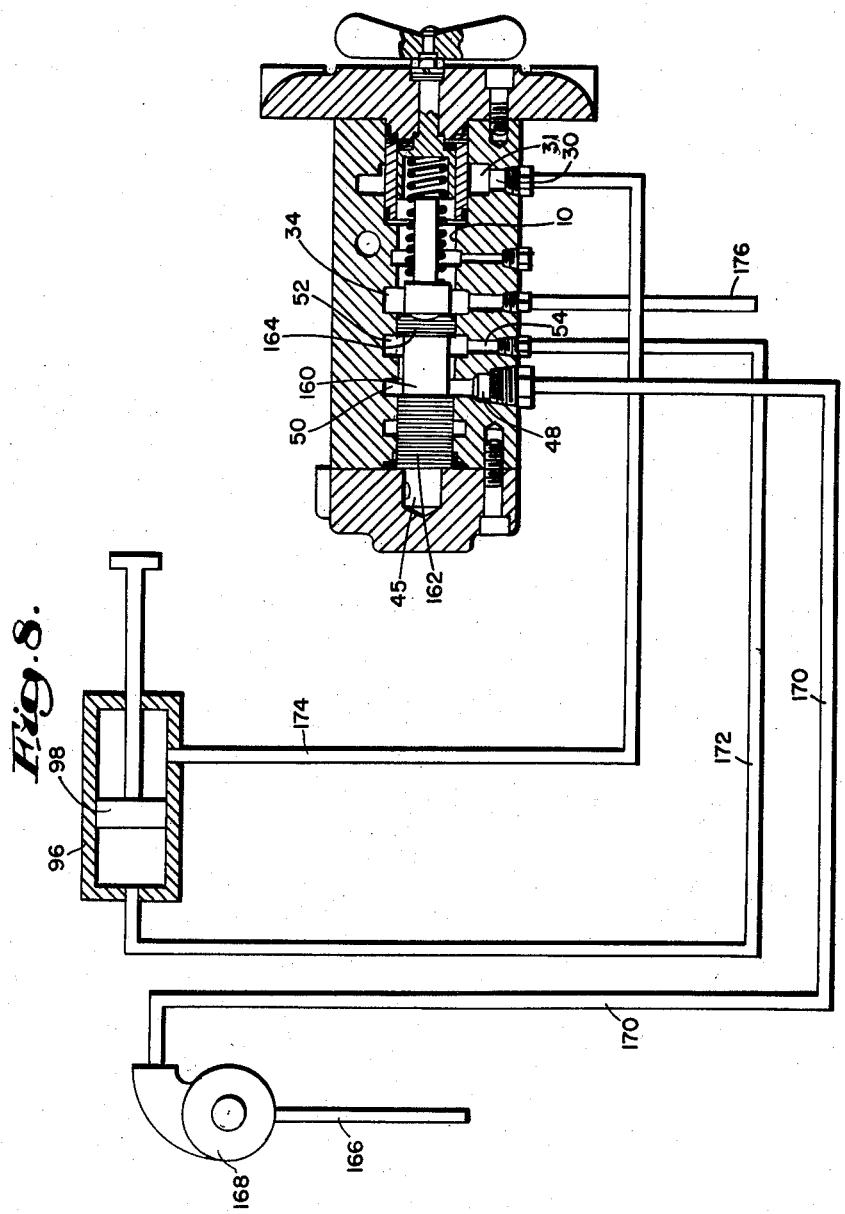
Inventor:
Leland K. Spink,
by Maxwell Fish
Attorney

United States Patent Office 2,838,030
Patented June 10, 1958

2,838,030

FLOW CONTROLLER

Leland K. Spink, Foxboro, Mass., assignor to Rivett Lathe & Grinder, Inc., Brighton, Mass., a corporation of Massachusetts Application September 28, 1954, Serial No. 458,921

15 Claims. (Cl. 121—45)

The present invention relates to an improvement in a fluid constant flow device which is well adapted for use in fluid pressure circuits generally, and more particularly for use in a hydraulic system having a source from which fluid is supplied under pressure and in a volume in excess of that required, and a hydraulic motor actuated by said fluid pressure.

It is a principal object of the invention to provide an improved flow controller for use in a hydraulic system of this general type which will be immediately responsive to changes in either inlet pressure or outlet pressure through the flow controller throughout the entire range of applied pressures which may vary between substantial positive and substantial negative values to effect corresponding adjustments in the device, and thereby to maintain a constant flow through the flow controller.

It is a further object of the invention to provide an improved flow controller for use in a hydraulic system of the general type referred to in which means are provided for bleeding off excess pressure from the supply side of the hydraulic motor in accordance with the actual requirements of the motor, and, in conjunction therewith, for throttling the output pressure from the flow controller, so that a constant flow is maintained through the flow controller with a minimum expenditure of power over the entire range of operating conditions which may vary from a heavy resistance load to an equally heavy overrunning load in the opposite direction.

It is a further object of the invention to provide a novel and improved flow controller for use in a hydraulic circuit of the general type referred to which will be relatively simple in construction and in operation and which is readily installed in any circuit of this general description to produce an efficient and stable regulation of the flow through the orifice outlet of the device.

With these and other objects in view, as may hereinafter appear, a principal feature of the device consists in the provision of a flow controller having a measuring orifice, a pilot valve which is immediately responsive to any disturbances in the balance of the pressure drop across the orifice, and a main throttle valve which is spring-pressed in one direction and is adapted to be moved in the opposite direction under the influence of the differential pressures provided across the orifice opening under the control of the pilot valve, the arrangement being such that the slightest increase in differential across the orifice opening will cause the throttle valve to be subjected to the full differential pressure acting upon the inlet face of the orifice whereas any decrease in differential has the capacity to impose zero differential upon the throttle valve, thus permitting the full force of the spring to act against the valve body.

Another feature of the invention consists in the construction and arrangement of the flow controller mechanism which comprises a measuring orifice, a main throttle valve which is spring pressed in one direction and is adapted to be moved in the opposite direction under the influence of the differential pressures provided across the orifice opening, and in combination therewith additional flow control connections in the throttle valve assembly by means of which a control of the fluid circuit by the flow controller mechanism may be obtained which is supplemental to, or entirely separate from the throttle action of the throttle valve so that the flow controller mechanism may be said to have a dual function.

More specifically, in one form of the invention the flow control unit is provided with additional flow control connections which are constructed and arranged when the throttle valve is actuated by an increase in pressure to by-pass the excess fluid and thereby to reduce the pressure across the unit before any throttling of the main valve takes place. The flow control unit is placed preferably in the exhaust line from the motor and the by-pass connections, referred to, are connected to by-pass the motor so that excess pressure from the pump is drawn off to reduce the pump load. Only in the event that a positive load is applied to the motor do the throttle valve connections in the flow control unit become operative to restrict the exhaust from the motor.

In another application of the flow controller unit in which the unit is placed in the inlet or supply connections from the pump to the motor, the by-pass connections may be used solely as a bleed-off device to bleed off excess pressure from the pump from supply to the motor.

Further in accordance with the invention the flow control unit, in a somewhat modified form, is utilized to control the rate of drive of a motor in a pneumatic or similar circuit utilizing a compressible fluid. In this form of the device the additional flow control connections take the form of a throttling device which in the circuit shown acts to throttle the input of a compressible fluid to the driven motor in response to the operation of the flow control unit located in the exhaust connections from the motor where pressure is usually constant. In this form of the device again, regulation is obtained entirely through the throttling action of the additional flow control connections; the main throttling valve becoming operative to throttle the flow of the exhaust fluid only in the event that a positive load is imposed upon the motor.

With the objects above noted in view, the several features of the invention consists also in the several steps of the method and in the constructions hereinafter described and claimed which, together with the advantages to be obtained thereby, will be readily understood by one skilled in the art from the following description taken in connection with the accompanying drawings in which Fig. 1 is a plan view of a flow controller valve unit embodying in the preferred form the several features of the invention, the casing of the unit being shown in solid lines including the several inlet and outlet ports and with the throttle valve and pilot valve bores and corings indicated in dotted lines;

Fig. 2 is a side elevation taken through the axes of the throttle valve and pilot valve bores;

Fig. 8 is a view partly in section of the fluid circuit including a pump, a driven motor, and a modified form of flow controller particularly adapted for use in a circuit using a compressible fluid such as air.

Figure 3:
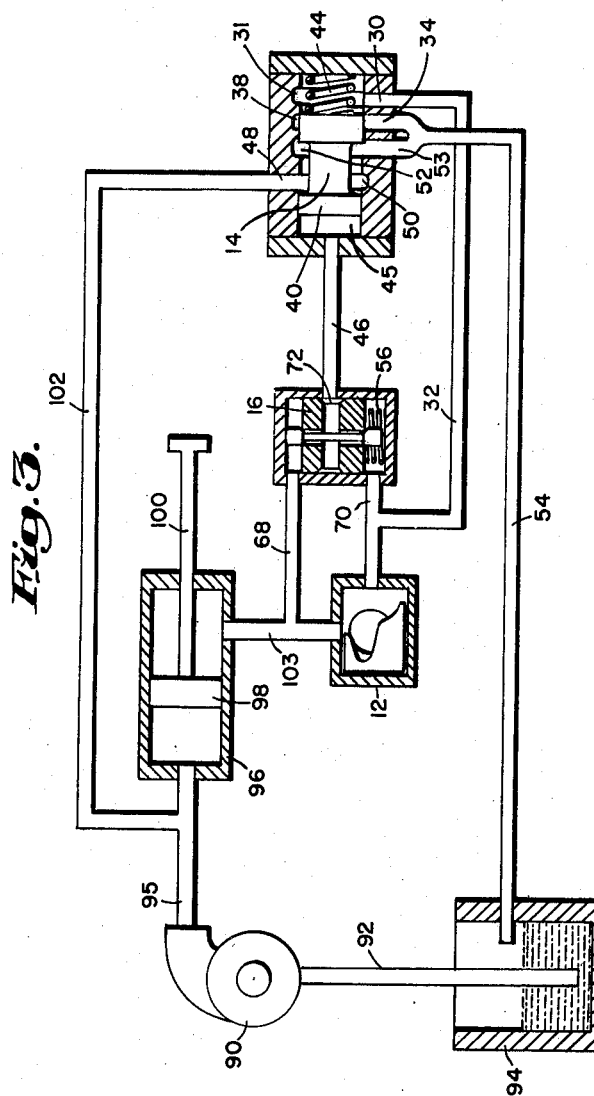
Fig. 3 is a diagrammatic view of a hydraulic circuit embodying the several elements of my flow control unit.

The flow controller which forms specifically the subject matter of the invention as shown in a preferred form in Figs. 1 and 2, comprises a casing 9 having formed therein two principal apertures 10 and 11 having their axes in parallel relation, the aperture 10 housing an adjustable orifice outlet assembly generally indicated at 12 and a throttle valve body generally indicated at 14, and the other aperture 11 housing a pilot valve body generally indicated at 16. The respective ends of the apertures are closed by facing members 18 and 20 secured to opposite sides of the casing 9.

Figure 5:
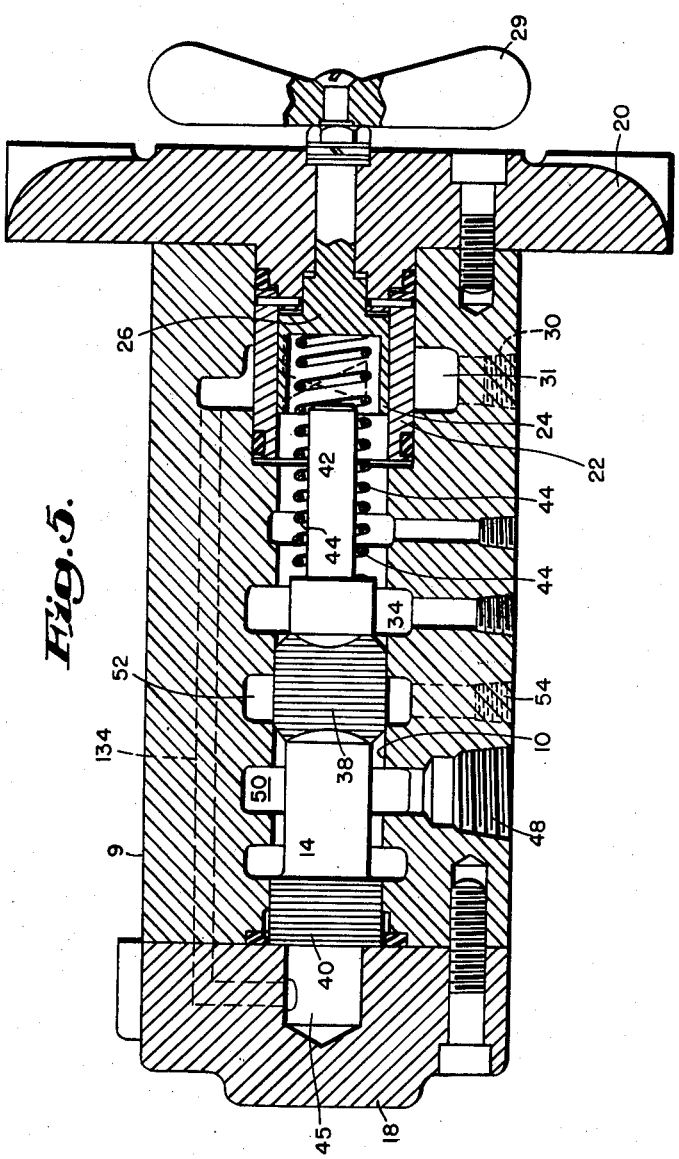
Fig. 5 is a sectional view of a modified form of the unit taken from substantially the same direction as Fig. 2 in which the pilot valve is omitted.

Referring more specifically to Fig. 2 of the drawings, the adjustable orifice opening is formed by means of a relatively fixed sleeve member 22 fixedly mounted in the internal wall of the supporting aperture 10, and a cooperating rotatably adjustable sleeve member 24 which is closed at the right hand end as viewed in Fig. 2 to form a hollow plug 26, and a stem 28 rotatably mounted in the cover plate 20 and provided at its outer end with a wing type manual controller 29. The flow of fluid to be controlled is directed to a flow controller inlet port 30 and cored cylindrical inlet duct 31 formed in the wall of the aperture 10 outside of the sleeve member 22 forming the input side of the orifice assembly which as best shown in Figs. 2 and 5 consists of the sleeve member 22 which is formed with a triangular shaped opening which is adapted to register with a correspondingly shaped opening in the inner adjustable sleeve element 24 of the orifice assembly to form an orifice which produces a regulated pressure drop from the outer to the inner face of the assembly. The fluid discharged from the output side of the orifice assembly 12 passes along the aperture 10 which is shown in diagrammatic Fig. 3 as conduit 32 connecting with an exhaust port 34 and thence back to the reservoir as hereinafter more fully illustrated in connection with the diagrammatic Fig. 3.

The throttle valve generally designated at 14 which occupies the left hand end of the aperture 10 takes the form of the movable valve body 14 having spool portions 38 and 40 and an intervening portion of smaller diameter, and at its right hand end a stem 42 (see Figs. 2 and 5) which is adapted to receive a coiled compression spring 44 which is seated at one end against the valve body 14 and at its other end against the plug 26 (see Fig. 5). The spool 40 at the left hand end of the valve body 14 is arranged to be acted upon by fluid pressure supplied to a chamber 45, particularly referred to as the effective inlet pressure chamber, and a duct 46 leading from the pilot valve (Figs. 2 and 3) so that the fluid pressure acting on the end of spool 40 will cause the valve body to be moved to the right against the pressure of the spring 44. A by-pass inlet port 48 formed in the aperture 10 is connected to a cored cylindrical pressure by-pass duct 50, the purpose of which will be more fully set forth in connection with the description of the diagrammatic view of Fig. 3. A cored cylindrical by-pass outlet duct 52 which is closed by the spool 38 for the extreme left hand position of the valve body 14, as shown in Fig. 2, is opened as the valve body is moved to the right to bleed fluid pressure from the by-pass inlet duct 50 through the cylindrical by-pass duct 52, and an exhaust port 53 and exhaust conduit 54 to the reservoir.

The pilot valve as best shown in Fig. 2 comprises specifically the pilot valve body 16 which is slidably supported within the aperture 11 and is moved yieldably to a limit position to the right under the influence of a coiled compression spring 56 seated at one end against the end of the aperture 11 and at its other end against a shoulder formed in the valve body. It will be noted that the aperture contains at its right hand end a stop 57 with a seal plug 58 with an O-ring gasket, the assembly being retained by coverplate 20.

In the embodiment of the invention shown in Fig. 2, the slidable valve body 16 of the pilot valve is formed at opposite ends with passageways 60 and 62 which connect with cylindrical ports 64 and 66 respectively formed in the periphery of the valve body 16. The passageway 60 and port 64 are connected with the cored flow control unit inlet duct 31 by means of a passageway 68.

The passageway 62 and port 66 are connected by means of a passageway 70 with a portion of the aperture 10 which connects the orifice valve with the throttle valve above described and which is designated in the diagrammatic view, Fig. 3, as conduit 70. Intermediate the passageway connections 68 and 70, above described, there is provided in the pilot valve aperture 11, a cylindrical outlet port 72 which connects with the passageway 46 and chamber 45 leading to the left hand end of the throttle valve as above set forth. The arrangement of the two spaced cylindrical ports 64 and 66 in the valve body 55 and the outlet ports 72 formed in the aperture 11 is such that for an intermediate neutral position the valve body 16, both ports 64 and 66 are closed off from outlet port 72. Movement of the valve body in either direction will cause the corresponding one of the ports 64 and 66 to be opened, thus connecting the passageway 46 and chamber 45 with either the upstream or downstream side of the orifice valve assembly as the case may be. It will be understood that the construction and arrangement of the pilot valve is such that both of the valve elements are never open at the same time since such a condition would in effect open the supply side of the measuring orifice directly to exhaust, which would thus by-pass the measuring orifice with consequent loss of accuracy of control.

Referring to the diagrammatic Fig. 3 of the drawings, the flow controller is particularly illustrated as embodied in a hydraulic circuit which includes a pump 90 which draws oil through a conduit 92 from a tank 94 and discharges through a conduit 95 into a hydraulic motor consisting of a cylinder 96 and a piston 98. A piston rod 100 extending from the opposite end of the cylinder may be loaded in any desired manner, as for example, by connection with the reciprocating table of a milling machine. A by-pass duct 102 is connected between the supply line 95 for the hydraulic motor, and port 48 of the throttle valve assembly 14 above described. The flow of fluid to be controlled as it is discharged from the leading side of the piston 98 through a conduit 103 to the input port 31 of the flow controller connecting with the upstream orifice 12. Fluid is discharged from the output side of the orifice opening through the conduit 32, and exhaust port 34 and thence through conduit 54 back to the reservoir 94. For the rest position of the valve mechanism shown in Figs. 1 and 2 in which the throttle valve body 14 is in its extreme position to the left the by-pass conduit 102 and connecting port 50 are fully shut off from the cylindrical port 52 and exhaust line 54 by the position of the spool portion 38 of the valve body 14.

As previously noted, conduit 68 connects the high pressure side of the orifice opening with passageway 60 and cylindrical port 64 of the pilot valve. Conduit 70 directs fluid pressure from the exhaust side of the orifice opening against the spring pressed right hand end of the throttle valve body 14. Fluid pressure is directed from the central outlet port 72 of the pilot valve through duct 46 to the chamber 45 formed at the left hand end of the throttle valve as shown in Fig. 2.

The operation of the flow control mechanism described is briefly as follows:

The mechanism is shown in the drawings in the rest positions taken when no power is applied. It is assumed that the hydraulic motor will be subjected to a substantial resistance load. When the pump 90 is started fluid pressure is applied through conduit 95 to the motor cylinder 96 and piston 98. Pressure is immediately built up in the conduit 103 producing a pressure differential or drop across the measuring orifice opening 12. While the throttle valve body 14 remains in its extreme position to the left under the influence of spring 44 fluid will be exhausted through the conduit 70, that is, along the length of the aperture 10 to exhaust port 34 whence it is returned through conduit 54 to the reservoir 94. For this starting position of the parts in which the throttle valve body is in its position to the extreme left the spool 38 fully closes the exhaust port 52 so that the by-pass conduit 102 and associated port 48 are blocked off. However, at the same time that pressure is built up at the input side of the orifice opening 12, fluid under pressure is supplied through port 31 and branch conduit 68 to passageway 60 and cylindrical port 64 of the pilot valve causing the pilot valve body 16 to be moved to the left from the position as shown in Fig. 2 (or downwardly, or as portrayed in Fig. 3) against the pressure of spring 56, thus causing the cylindrical port 66 to be shut off and the cylindrical port 64 to be connected with the outlet port 72. Fluid pressure is thus admitted from passageway 103 through port 31, passageway 68, port 64 and passes thence through duct 46 to the left hand end of the throttle valve body 14 which is now caused to move to the right against the pressure of its spring 44. This movement of the throttle valve body 14 starts to uncover the cylindrical bypass outlet duct 52 and exhaust port 53 so that fluid under pressure is discharged from by-pass conduit 102 through the valve body 14 and conduit 54 back to the reservoir. Assuming that the hydraulic motor cylinder 96 and piston 98 are operating under an average positive load the bleeding off of excess pressure through by-pass conduit 102 will cause the fluid pressure in the exhaust conduit 103 from the fluid motor to the input side of the measuring orifice opening to be brought into balance with the exhaust pressure from the outlet side of the orifice opening at the desired differential as determined by the strength of the pilot valve spring 56. At this point the pilot valve body 16 will be brought into an intermediate neutral position to maintain the flow control mechanism in complete balance.

With the arrangement shown it will be noted that the throttle valve member 14 is always acted upon in one direction by the spring 44 and by the outlet pressure from the measuring orifice. The throttle valve body 14 is acted upon in the opposite direction by an outlet pressure from the pilot valve which will be either the full pressure existing at the input side of the measuring orifice or alternatively will be the lower pressure existing at the output side of the measuring orifice except for a theoretical middle position of the pilot valve, in which a balance may be said to exist and both inlet ports for the pilot valve are shut off. The operation of the pilot valve thus has the advantage that movement of the pilot valve causes the pressure exerted on the valve body 14 against the pressure of the spring 44 to be shifted instantly between a maximum and a minimum value and thus to produce a maximum change of pressure and a correspondingly rapid correction in the position of the throttle valve body 14.

The present invention is so constructed and arranged that increase in pressure of the fluid discharged through the measuring orifice unit moves the throttle valve body to the right, first to open the by-pass 102 to exhaust until the input pressure to the motor 96 is reduced to zero. Assuming that there is an overrunning load on the piston 98, continued movement of the valve body 14 to the right as the inlet pressure to the measuring orifice continues to be built up causes the throttle valve body 14 to move still further to the right closing off the cylindrical exhaust duct 34 and exhaust pipe 54 connected thereto. This throttling of the discharge of fluid from the outlet side of the measuring orifice causes the pressure at the two sides of the measuring orifice to be kept in balance, and thus acts to maintain an even rate of exhaust of the fluid from the cylinder 96.

Figure 4:
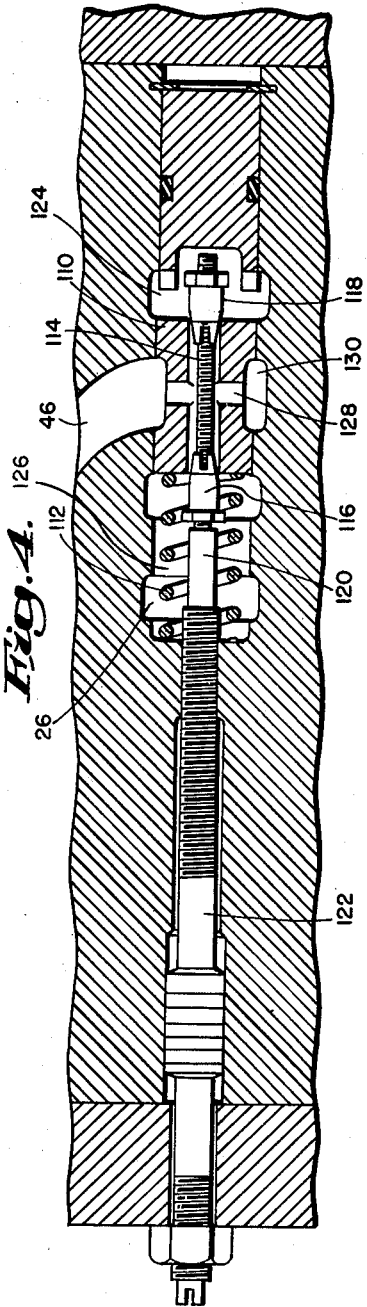
Fig. 4 is a detailed sectional view of a modified form of the pilot valve mechanism associated with the device.

In Fig. 4 of the drawings is shown a modified form of the pilot valve mechanism which, however, performs the same function as the preferred form of the device shown in Fig. 2 of the drawings. The pilot mechanism of Fig. 4 has been indicated diagrammatically in the diagrammatic Fig. 3. Referring specifically to Fig. 4 a pilot valve body 110 is slidably supported within the pilot valve aperture and is moved yieldably to a limiting position to the right under the influence of a coiled compression spring 112 seated against the shoulder in the aperture. The pilot valve body 110 is provided with a central bore into which is loosely fitted a spacer rod 114 on which are adjustably mounted at opposite ends thereof two valve elements 116 and 118. The spacer rod 114 is normally stationary being biased to the left against stop 120 by the differential pressure. In starting, free movement of the rod 114 to the right is limited by a plug so that the element 118 remains closed. For an intermediate position of the pilot valve body 110 both elements 116 and 118 are located within the bore closing off both ends thereof. A very slight movement of the valve body 110 is sufficient to uncover one or the other end of the bore. The arrangement of these parts is such that movement of the pilot valve body 110 to the left will cause the spacer rod 114 engaged with a stop surface 120 formed at the end of an adjustable rod 122 mounted within the left hand end of the pilot valve aperture to open the port between 118 and 110. For this leftward position of the pilot valve body 110, the valve element 116 is seated and the valve element 118 is relatively raised. Upon movement of the valve body 110 to the right from the position shown in Fig. 4 valve 118 is closed and valve 116 opens as the differential pressure continues to hold 114 against stop 120. Fluid under pressure is supplied to a chamber 124 at the right hand end of the pilot valve assembly from the input side of the orifice outlet by means of the conduit 68, above described (see Fig. 3). Fluid under pressure is supplied to a chamber 126 at the left hand end of the pilot valve assembly through the conduit 70 connected with the output side of the orifice provided by the sleeve member 22 and sleeve member 24. The pilot valve body 110 is also provided intermediate its length with a transverse bore 128 which connects with a cylindrical conduit 130 which is in turn connected to the conduit 46, previously described, leading to the chamber 45 formed at the left hand end of the throttle valve 14.

Figure 7:
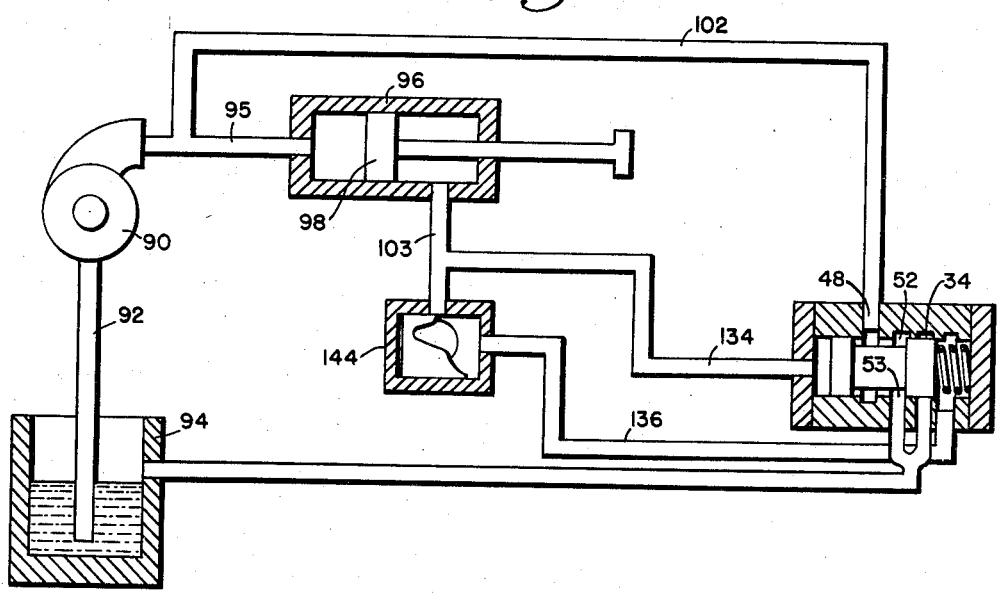
Fig. 7 is a diagrammatic view of a hydraulic circuit similar to that shown in Fig. 3, but with the pilot valve omitted in accordance with the disclosure of Fig. 5.

Fig. 5 of the drawings illustrates a flow control unit which is similar to that shown in Figs. 1 and 2 except that the pilot valve has been omitted and in which the cylindrical inlet duct 31 for the unit is directly connected with the chamber 45 at the opposite or left hand end of the unit by means of a duct 134. In this form of the device the parts of the measuring orifice, including the outer sleeve 22 and inner sleeve 24 remain unchanged. The throttle valve body 14 also is identical with that shown in Figs. 1 and 2 having the spool portions 38 and 40. The valve body is biased to the left by means of spring 44. The operation of the flow control unit shown in Fig. 5 when placed in the exhaust line from a motor may be briefly described in connection with the somewhat diagrammatic Fig. 7. In this view it will be noted that the pipe line 134 from the inlet side of the measuring orifice connects with the left hand end of the aperture supporting valve body 14. Fluid pressure is discharged from the measuring orifice along the aperture 10, indicated in Fig. 7 as pipe 136, until it is brought into contact with the right hand end of the valve body 14. In this form of the device the pressure of the spring 44 and of the fluid pressure discharged from the measuring orifice are balanced by the pressure existing at the inlet side of the measuring orifice.

Assuming that the pump 90 is started in operation fluid from the reservoir 94 is drawn through pipe 92 through the pump 90 and inlet pipe 95 to the motor 96, 98. Movement of the piston 98 to the right causes pressure to be built up through the measuring orifice so that the fluid under the pressure existing at the inlet side of the measuring orifice is supplied through pipe 134 against the left hand end of the valve body 14. Fluid at a lower pressure is supplied from the outlet side of the measuring orifice from the pipe 136 to the right hand end of the valve body 14. Under these conditions the valve body 14 will be moved to the right against the pressure of spring 44 so that the spool 38 moves to the right to uncover cylindrical exhaust duct 53 so that fluid is by-passed around the motor 96, 98 through by-pass pipe 102. Assuming that pressure continues to be built up in the flow control unit the valve body 14 will move further to the right throttling the exhaust connection 34 through which fluid is drawn from the outlet side of the measuring orifice.

Figure 6:
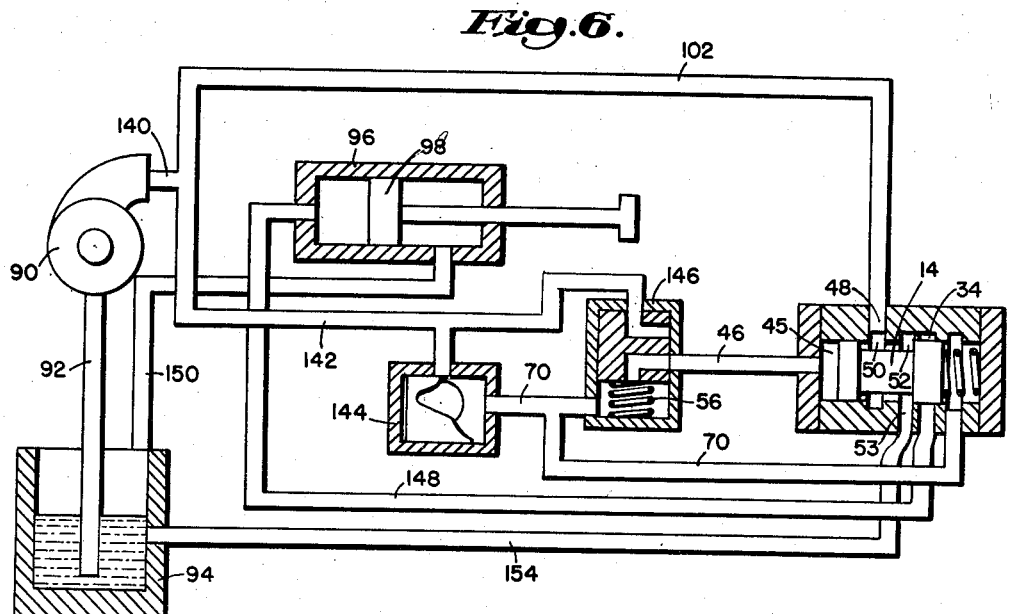
Fig. 6 is a diagrammatic detail view of my flow controller including the pilot valve and the by-pass connections connected into the input side of the motor hydraulic circuit.

Fig. 6 of the drawings illustrates a modified hydraulic circuit in which the flow control unit of Figs. 1 and 2, including the pilot valve, is placed in the supply line to the motor 96, 98. In this form of the device fluid pressure is pumped from the reservoir 94 through pump 90 into a supply line 140 having one branch line 142 which connects with the inlet side of the orifice generally designated at 144 and with the inlet side of the pilot valve, generally designated at 146. The outlet side of the measuring orifice 144 is connected by means of pipe 70 with the other inlet port of the pilot valve. The outlet port of the pilot valve is connected through pipe 46 with chamber 45 in the right hand end of the throttle valve body 14. The exhaust connection from the throttle valve comprising the cylindrical duct 34 and exhaust port associated therewith are connected by a pipe line 148 with the inlet side of the motor 96, 98. The exhaust side of the motor 96, 98 is connected by means of a pipe 150 directly with the sump 94. With the hydraulic circuit shown in Fig. 6, the by-pass connections of the flow controller unit are employed only as a bleeder device to reduce the operating pressure supplied to the motor from the outlet side of the measuring orifice. Fluid from the by-pass or bleeder line 102 passes through the by-pass inlet port 48, through cylindrical conduits 50 and 52, and exhaust port 53 to an exhaust line 154 connecting directly with the sump of the reservoir 94.

Fig. 8 of the drawings illustrates an adaptation of my improved flow controller unit for use in a fluid circuit employing a compressible fluid such as air. In this form of the device a flow controller unit is employed which may be either that shown in Figs. 1 and 2 provided with a pilot mechanism, or that shown in Fig. 5 in which the pilot mechanism has been omitted. The valve unit is similar to those previously shown except for a change in the arrangement of the spool portions of the throttle valve body 160. In this form of the device the left hand spool 162 has been substantially lengthened so that movement of the valve body 160 from its limit position toward the right will have the effect of throttling the by-pass inlet duct 50 and associated inlet port 48. The right hand spool 164 has also been reshaped so that for the limit position of the valve body 160 to the left the cylindrical exhaust duct 52 and exhaust port 54 are uncovered, thus for this position of the valve, allowing a free passage of fluid through the by-pass inlet and outlet ports. The spools 162 and 164 and valve body 160 are constructed and arranged so that movement of the valve body 160 to the right from its limit position acts first to throttle the so-called by-pass connections in the valve, and thereafter to throttle the connections from the measuring orifice through the throttling valve to exhaust.

Referring to the pneumatic circuit shown in Fig. 8 air is drawn through a pipe 166 into a pumping unit 168 and thence passes through pipe 170 to the by-pass inlet port 48. Air passing through the by-pass inlet and outlet connections is piped from the outlet port by-pass exhaust port 54 through a pipe 172 to the inlet side of the motor 96, 98 having a piston 98. Fluid is piped from the outlet or exhaust side of the motor 96, 98 through a pipe 174 to the main inlet port 30. Thence fluid passes to the inlet side of the measuring orifice and through the duct 134 as shown in Fig. 2 to the chamber 45 at the left hand end of the throttle valve body 160. Fluid is directed from the outlet side of the measuring orifice along the throttle valve aperture 10 to the right hand end of the throttle valve body 160, and passes to exhaust through the cylindrical exhaust duct 34, and exhaust port to an exhaust pipe 176.

In the operation of the pneumatic system illustrated in Fig. 8 it will be noted that while the flow control unit is located in and is responsive to variations of pressure in the exhaust side of the motor 96, 98 that a second set of throttling connections are provided which act to throttle a supply of compressible fluid to the motor. It will be noted that the measuring orifice and throttle valve, associated therewith, are located on the exhaust side of the motor 96, 98 so that measurement control is obtained at a point in the circuit where the compressible fluid pressure is constant. This condition obtains particularly in the exhaust connections from the motor. The actual regulation, however, takes place at the input side of the motor 96, 98. With this arrangement it will be understood that the exhaust pressure from the motor is constant only when this exhaust pressure is not throttling. For this reason the device is constructed and arranged so that throttle valve connections at the exhaust side of the motor never become operative except where there is a negative load on the motor, which makes such additional throttling necessary.

The invention having been described what is claimed is:

1. For use in a fluid pressure system, having a source from which fluid is supplied under pressure and in volume in excess of that required, a fluid actuated device actuated by said fluid pressure, and a by-pass connection for said fluid under pressure by-passing said fluid actuated device, a fluid flow control unit which comprises, a casing, a valve body shiftable within the casing, a fluid pressure inlet including an inlet chamber disposed in the casing for directing fluid against the valve body to force said body in one direction, a fluid pressure exhaust including a fluid pressure exhaust port and an exhaust chamber disposed in the casing for directing fluid against the valve body in the opposite direction, yieldable means acting on said valve body to move said valve body to a limit position, a fluid pressure by-pass inlet port from said bypass connection and a bypass exhaust port in the casing, a measuring orifice having inlet and outlet sides thereof connected respectively with said inlet and outlet chambers, said valve body having portions operable upon movement of the valve body from said limit position to open a passageway between, said by-pass inlet port and said by-pass exhaust port and operative upon further movement of the valve body from said limit position to throttle said fluid pressure exhaust port.

2. For use in a fluid pressure system, having a source from which fluid is supplied under pressure and in volume in excess of that required, a fluid actuated device actuated by said fluid pressure, and a by-pass connection for said fluid under pressure by-passing said fluid actuated device, a fluid flow control unit which comprises a casing, a valve body shiftable within the casing, a fluid pressure inlet chamber disposed in the casing for directing fluid against the valve body to force said body in one direction, a fluid pressure exhaust including a fluid pressure exhaust port and a fluid pressure exhaust chamber disposed in the casing for directing fluid against the valve body in the opposite direction, spring means acting on said valve body to move said valve body to a limit position, a fluid pressure by-pass inlet port from said bypass connection and a by-pass exhaust port in the casing, a measuring orifice having inlet and outlet sides thereof connected respectively with said inlet and outlet chambers, said valve body having a portion operable for said limit position of the valve body to throttle said by-pass exhaust port and operative upon movement of said valve body from said limit position to open said by-pass inlet port to said by-pass exhaust port, said valve body having a second portion rendered operative by further movement of the valve body from said limit position to throttle said fluid pressure exhaust port.

3. For use in a fluid pressure system, having a source from which fluid is supplied under pressure and in volume in excess of that required, a fluid process motor actuated by said fluid pressure, and a by-pass connection for said fluid under pressure by-passing said fluid process, a fluid control unit which comprises a casing, a valve body shiftable within the casing, a fluid pressure inlet including an inlet chamber in the casing for directing fluid against the valve body to force the body in one direction, a fluid pressure exhaust including an exhaust chamber in the casing for directing fluid pressure against the valve body in the opposite direction, a fluid pressure exhaust port from said exhaust chamber in the casing, yieldable means acting on said valve body to move said valve body to a limit position against said inlet fluid pressure, by-pass inlet and by-pass exhaust ports in the casing, said by-pass inlet port being connected with said by-pass connection a measuring orifice having inlet and outlet sides thereof connected respectively with said inlet and exhaust chambers, said valve body having a portion operable within said limit position of the valve body to throttle said by-pass exhaust port and operative upon movement of said valve body against said yieldable means to open a passageway between said by-pass inlet and the by-pass exhaust ports, said valve body also having a portion rendered operative by further movement of the valve body against said yieldable means to throttle said fluid pressure exhaust port.

4. For use in a fluid pressure system, having a source from which fluid is supplied under pressure and in volume in excess of that required, a fluid process actuated by said fluid pressure, and a by-pass connection for said fluid under pressure by-passing said fluid process, a fluid flow control unit, which comprises a casing having a cylindrical aperture formed therein, a cylindrical throttle valve body axially shiftable within said aperture and having opposed inlet pressure and exhaust pressure faces, an adjustable measuring orifice opening into said aperture at one end of the valve, yieldable means acting on the valve body to shift the body to a limit position away from the orifice opening, a fluid pressure inlet including inlet ports in the casing for directing fluid against the inlet side of said orifice and against the inlet pressure face of the valve body to force said body against said yieldable means, inlet and by-pass exhaust ports into the aperture in the casing, said bypass inlet port being connected with said bypass connection, and an exhaust port from said aperture between said orifice and valve body exhaust face, said valve body having a spool portion arranged for said limit position of the valve body to shut off the by-pass inlet port from said by-pass exhaust port operative upon movement of the valve body against said yieldable means to open a passageway between said by-pass inlet and by-pass exhaust ports, and a spool portion operative upon further movement of said valve body in the same direction to close off the orifice outlet from said orifice exhaust port.

5. For use in a fluid pressure system, having a source from which fluid is supplied under pressure and in volume in excess of that required, a fluid actuated device actuated by said fluid pressure, and a by-pass connection for said fluid under pressure by-passing said fluid actuated device, a fluid flow control unit which comprises a casing having cylindrical throttle valve and pilot valve apertures formed therein, a cylindrical throttle valve body axially shiftable within said throttle aperture having opposed inlet pressure and exhaust pressure faces, and adjustable measuring orifice opening into said throttle aperture at one end of the valve, yieldable means biasing the throttle valve body toward a limit position away from the orifice, a cylindrical pilot valve body axially shiftable within said pilot valve aperture having opposed orifice inlet and outlet pressure exposed faces and conduits therefrom rendered operative by shifting movement of the pilot valve body in response to said respective orifice inlet and outlet pressures to connect said orifice inlet and outlet pressures alternatively with said throttle valve inlet pressure face, yieldable means biasing the pilot valve body in a direction to connect said outlet pressure with the throttle valve inlet pressure face, by-pass inlet and by-pass ports in the casing connecting with the throttle valve aperture, said by-pass inlet port being connected with said by-pass connection an exhaust port from the aperture between the outlet side of said orifice and said exhaust pressure face of the valve body, a port connecting the outlet pressure face of the pilot valve body with said orifice exhaust port, a fluid pressure inlet including inlet ports to the measuring orifice and to the inlet pressure face of said pilot valve body, said throttling valve body having portions rendered operative by movement of the valve body from said limit position to open a passageway between said by-pass inlet and said by-pass outlet ports, and rendered operative by further movement of said valve body from said limit position to throttle said exhaust port from the outlet side of the orifice and from the exhaust pressure face of the valve body.

6. For use in a fluid pressure system, having a source from which fluid is supplied under pressure in excess of that required, a fluid actuated device actuated by said fluid pressure, and a by-pass connection for said fluid under pressure by-passing said fluid actuated device, a fluid flow control unit which comprises a casing, an adjustable measuring orifice in the casing restricting flow of an inlet fluid pressure to exhaust, a throttling valve body shiftable within the casing having opposed effective inlet and exhaust pressure actuating faces, an effective inlet fluid pressure chamber in the casing for directing fluid against said inlet actuating face, and a fluid exhaust chamber in the casing for directing fluid at exhaust pressure against said exhaust face and the exhaust side of said measuring orifice, yieldable means biasing said throttle valve body to a limit position toward said effective inlet fluid pressure chamber, a pilot valve having an outlet connecting with said effective inlet fluid pressure chamber and a shiftable pilot valve body having opposed inlet pressure and exhaust pressure actuating surfaces, and ducts arranged to be shut off for an intermediate position of the pilot valve body, and responsive to movement of said pilot valve body under the influence of inlet pressure to connect said orifice inlet pressure with said outlet and responsive to movement of said pilot valve body under the influence of said exhaust pressure to connect said exhaust pressure with the throttle valve effective inlet pressure chamber, yieldable means biasing said pilot valve body to connect said inlet chamber with exhaust, and by-pass inlet and by-pass exhaust ports in the casing, said by-pass inlet port being connected with said by-pass connection said valve body having portions operable upon movement of the throttle valve body from said limit position to open a passageway between said by-pass inlet port and said by-pass exhaust port, and operable upon further movement of the valve body from said limit position to throttle said fluid pressure exhaust port.

7. For use in a fluid pressure system, having a source from which fluid is supplied under pressure and in volume in excess of that required, a fluid actuated device actuated by said fluid pressure, and a by-pass connection for said fluid under pressure by-passing said fluid actuated device, a fluid control unit which comprises a casing, an adjustable measuring orifice in the casing restricting the flow of an inlet fluid pressure to exhaust, a throttling valve body shiftable within the casing having opposed effective inlet and exhaust pressure actuating faces, an effective inlet fluid pressure chamber in the casing for directing fluid against said inlet actuating face, an inlet port connecting with the inlet side of said measuring orifice and with said effective inlet pressure chamber and a fluid exhaust chamber in the casing for directing fluid at an exhaust pressure against said exhaust face and against the exhaust side of said measuring orifice, yieldable means biasing the throttle valve body to a limit position toward said effective inlet pressure chamber, an exhaust port connecting with said exhaust chamber, fluid pressure by-pass inlet and exhaust ports in the casing, said bypass inlet port being connected with said bypass connection, and said valve body having a throttling portion operable upon movement of the valve body from said limit position to control the passage of fluid between said by-pass inlet and exhaust ports, and operable upon further movement of the valve body from said limit position to throttle said fluid pressure exhaust port.

8. For use in a fluid pressure system, having a source from which fluid is supplied under pressure and in volume in excess of that required, a fluid actuated motor actuated by said fluid pressure, and a by-pass connection for said fluid under pressure by-passing said fluid actuated motor, a fluid flow control unit which comprises a casing, an adjustable measuring orifice in the casing restricting the flow of an inlet fluid pressure to exhaust, a throttling valve body shiftable within the casing having opposed effective inlet and exhaust pressure actuating faces, an effective inlet fluid pressure chamber in the casing for directing fluid against said inlet actuating faces, an inlet port connecting with the inlet side of said measuring orifice and with said effective inlet pressure chamber, and a fluid exhaust chamber in the casing for directing fluid at an exhaust pressure against said exhaust face and from the exhaust side of said measuring orifice, yieldable means biasing the throttle valve body to a limit position toward said inlet chamber, an exhaust port connecting with said exhaust chamber, fluid pressure by-pass inlet and exhaust ports in the casing, said by-pass inlet port being connected with said by-pass connections said valve body having a throttling portion operable upon movement of said valve body from said limit position to throttle the passage of fluid between said by-pass inlet and exhaust ports, and operable upon further movement of said valve body from said limit position to throttle said fluid pressure exhaust port.

9. In a hydraulic system having a source from which fluid is supplied under pressure in excess of that required and a hydraulic motor actuated by said fluid pressure, the combination of a flow control unit which comprises a casing, a measuring orifice in the casing restricting flow of an inlet fluid pressure to exhaust, a throttle valve body shiftable within the casing having opposed effective inlet pressure and exhaust pressure actuating faces, an effective inlet fluid pressure chamber in the casing for directing fluid against said inlet face of the valve body, an inlet port in the casing connecting with the inlet side of said orifice and with said effective inlet pressure chamber, a fluid pressure exhaust chamber in the casing for directing fluid pressure against said exhaust pressure face of the valve body, a fluid pressure exhaust port from said exhaust chamber in the casing, yieldable means acting on said valve body to move said valve body to a limit position against said effective inlet fluid pressure, by-pass inlet and by-pass exhaust ports in the casing, said valve body having portions operable upon movement of the valve body from said limit position to open said by-pass connections including said by-pass exhaust port and operable upon further movement of the valve body from said limit position to throttle said fluid pressure exhaust port, a by-pass connection from said hydraulic motor to said by-pass inlet port by-passing the hydraulic motor, and an exhaust connection from the motor connecting with said fluid pressure inlet port and chamber in the casing.

10. In a hydraulic system having a source from which fluid is supplied under pressure in excess of that required and a hydraulic motor actuated by said fluid pressure, the combination of an adjustable measuring orifice connected with the exhaust side of said motor restricting the flow of fluid pressure from the motor to exhaust, a throttle valve comprising a shiftable throttle valve body having opposed effective inlet pressure and exhaust pressure actuating faces, means directing fluid under pressure from the inlet side of said measuring orifice against said inlet actuating face and fluid from the exhaust side of said measuring orifice against the exhaust actuating face of said throttle valve, an exhaust connection from the exhaust side of the measuring orifice arranged to be throttled by said throttle valve body, by-pass connections from the fluid pressure source to exhaust by-passing said motor and arranged to be throttled by said throttle valve body, yieldable means biasing the valve body to a limit position against said effective inlet pressure, said throttle valve body being constructed and arranged with relation to said by-pass connections and said exhaust port so that movement of the throttle valve body from said limit position is effective first to open said by-pass connections and thereafter to throttle said exhaust port.

11. In a hydraulic system having a source from which fluid is supplied under pressure in excess of that required and a hydraulic motor actuated by said fluid pressure, the combination of an adjustable measuring orifice connected with the exhaust side of said motor restricting the flow of fluid pressure from the motor to exhaust, a throttle valve comprising a shiftable throttle valve body having opposed effective inlet pressure and exhaust pressure actuating faces, a pilot valve comprising a movable pilot valve body having opposed orifice inlet and exhaust pressure exposed faces and conduits therefrom rendered operative by movement of the pilot valve body to connect said orifice inlet and exhaust pressures alternatively with said throttle valve inlet pressure face, yieldable means biasing the pilot valve body in a direction to connect said throttle valve exhaust pressure with the throttle valve inlet pressure face, an exhaust connection from the exhaust side of the measuring orifice arranged to be throttled by said throttle valve body, by-pass connections from the fluid source to exhaust by-passing said motor and arranged to be throttled by said throttle valve body, yieldable means biasing the valve body to a limit position against said effective inlet pressure, said throttle valve body being constructed and arranged with relation to said by-pass connections and said exhaust port so that movement of the throttle valve body from said limit position is effective first to throttle said by-pass connections and thereafter to throttle said exhaust port.

12. In a hydraulic system having a source from which fluid is supplied under pressure in excess of that required and a hydraulic motor actuated by said fluid pressure, the combination of an adjustable measuring orifice connected with the exhaust side of the motor restricting the flow of fluid from the motor to exhaust, a throttle valve comprising a shiftable throttle valve body having opposed effective inlet pressure and exhaust pressure actuating faces, means directing fluid under pressure from the inlet side of said measuring orifice against said inlet actuating face and fluid from the exhaust side of said measuring orifice against the exhaust actuating face of said throttle valve, an exhaust connection from the exhaust side of the measuring orifice arranged to be throttled by said throttle valve body, by-pass connections from the fluid pressure source to exhaust arranged to be throttled by said throttle valve body, yieldable means biasing the valve body to a limit position against said effective inlet pressure, said throttle valve body being constructed and arranged with relation to said by-pass connection and said exhaust port so that movement of the throttle valve body from said limit position is effective first to control the throttle of said by-pass connections and thereafter to throttle said exhaust port.

13. In a fluid pressure system having a source from which fluid is supplied under pressure in excess of that required and a fluid motor actuated by said fluid pressure, the combination of an adjustable measuring orifice connected with the exhaust side of the motor restricting the flow of fluid pressure from the motor to exhaust, a throttle valve comprising a shiftable throttle valve body having opposed effective inlet pressure and exhaust pressure actuating faces, means directing fluid under pressure from the inlet side of said measuring orifice against said inlet actuating face and fluid from the exhaust side of said measuring orifice against the exhaust actuating face of said throttle valve, an exhaust connection from the exhaust side of the measuring orifice arranged to be throttled by said throttle valve body, by-pass connections through the throttle valve arranged to be throttled by said throttle valve body said by-pass connections being connected to provide a flow conduit, yieldable means biasing the valve body to a limit position against said effective inlet pressure, said throttle valve body being constructed and arranged with relation to said by-pass connection of said exhaust port so that movement of the throttle valve body from said limit position is effective first to throttle said by-pass connections and thereafter to throttle said exhaust port.

14. For use in a fluid pressure system, having a source from which fluid is supplied under pressure in excess of that required, a fluid actuated device actuated by said fluid pressure, and a bypass connection for said fluid under pressure bypassing said fluid actuated device, a fluid flow control unit which comprises a casing, an adjustable measuring orifice in the casing restricting flow of an inlet fluid pressure to exhaust, a throttling valve body shiftable within the casing having opposed effective inlet and exhaust pressure actuating faces, an effective inlet fluid pressure chamber in the casing for directing fluid against said inlet actuating face, and a fluid exhaust chamber in the casing for directing fluid at exhaust pressure against said exhaust face and the exhaust side of said measuring orifice, yieldable means biasing said throttle valve body to a limit position toward said effective inlet fluid pressure chamber, a pilot valve having an outlet connecting with said effective inlet fluid pressure chamber and a shiftable pilot valve body having opposed inlet pressure and exhaust pressure actuating surfaces, and ducts arranged to be shut off for an intermediate position of the pilot valve body, and responsive to movement of said pilot valve body under the influence of inlet pressure to connect said orifice inlet pressure with said outlet and responsive to movement of said pilot valve body under the influence of said exhaust pressure to connect said exhaust pressure with the throttle valve effective inlet pressure chamber, yieldable means biasing said pilot valve body to connect said inlet chamber with exhaust, and bypass inlet and bypass exhaust ports in the casing, said bypass inlet port being connected with said bypass connection, said valve body having portions operable upon movement of the throttle valve body from said limit position to open a passageway between said bypass inlet port and said bypass exhaust port.

15. In a hydraulic system having a source from which fluid is supplied under pressure in excess of that required and a hydraulic motor actuated by said fluid pressure, the combination of an adjustable measuring orifice connected with said motor restricting the flow of fluid pressure from the motor to exhaust, a throttle valve comprising a shiftable throttle valve body having opposed effective inlet pressure and exhaust pressure actuating faces, a pilot valve comprising a movable pilot valve body having opposed orifice inlet and orifice exhaust pressure exposed faces and conduits therefrom rendered operative by movement of the pilot valve body to connect said orifice inlet and exhaust pressures alternatively with said throttle valve inlet pressure face, yieldable means biasing the pilot valve body in a direction to connect said throttle valve exhaust pressure with the throttle valve inlet pressure face, an exhaust connection from the exhaust side of the measuring orifice arranged to be throttled by said throttle valve body, yieldable means biasing the valve body to a limit position against said effective inlet pressure, said throttle valve body being constructed and arranged with relation to said exhaust port so that movement of the throttle valve body from said limit position is effective to throttle said exhaust port.

References Cited in the file of this patent
UNITED STATES PATENTS

| | | |
|---|---|---|
| 2,264,375 | Hill et al. | Dec. 2, 1941 |
| 2,632,459 | Yengrt | Mar. 24, 1953 |
| 2,694,405 | Field | Nov. 16, 1954 |